April 5, 1966   C. S. COCKERELL   3,244,244
AIR CUSHION VEHICLES HAVING FLEXIBLE SKIRTS DEFLECTABLE
BY SUBSIDIARY CUSHION PRESSURE
Filed Nov. 12, 1963   4 Sheets-Sheet 1
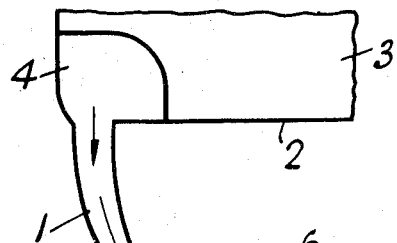
FIG.I.
PRIOR ART
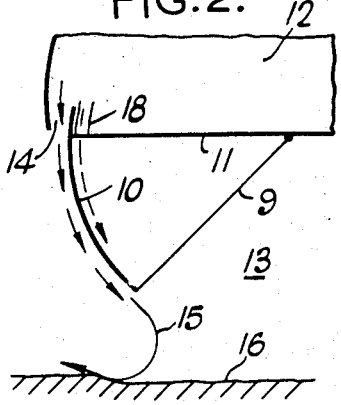
FIG.2.
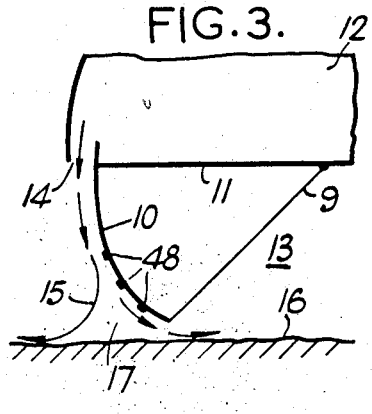
FIG.3.
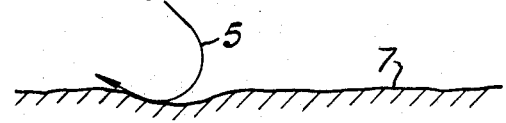
FIG.4.
INVENTOR
C. S. COCKERELL
BY
Cameron, Kerkam & Sutton
ATTORNEYS INVENTOR
C. S. COCKERELL
BY
Cameron, Kerkam & Sutton
ATTORNEYS April 5, 1966 C. S. COCKERELL 3,244,244
AIR CUSHION VEHICLES HAVING FLEXIBLE SKIRTS DEFLECTABLE
BY SUBSIDIARY CUSHION PRESSURE
Filed Nov. 12, 1963 4 Sheets-Sheet 3
FIG. 10.
FIG. 9.
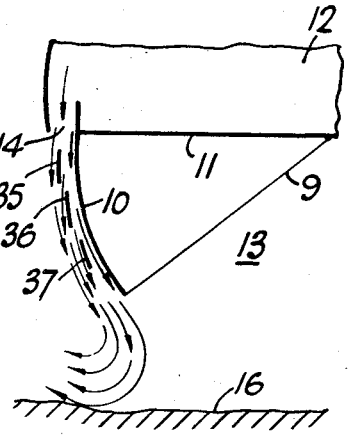
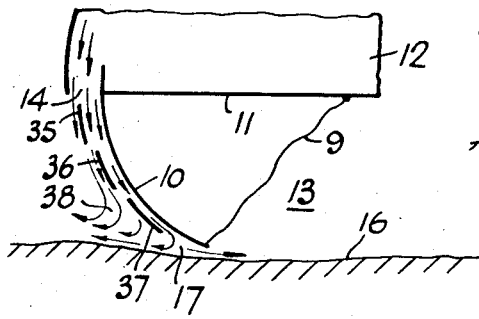
FIG. 11.
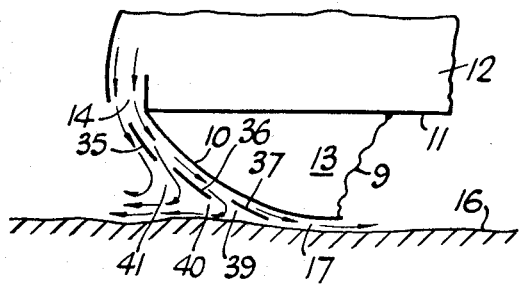
FIG. 12.
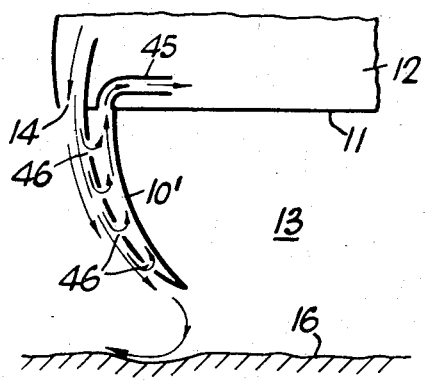
INVENTOR
C. S. COCKERELL
BY
Cameron, Kerkam & Sutton
ATTORNEYS April 5, 1966

C. S. COCKERELL 3,244,244

AIR CUSHION VEHICLES HAVING FLEXIBLE SKIRTS DEFLECTABLE
BY SUBSIDIARY CUSHION PRESSURE

Filed Nov. 12, 1963

INVENTOR

C. S. COCKERELL

BY
Cameron, Kerkam & Sutton
ATTORNEYS

United States Patent Office 3,244,244
Patented Apr. 5, 1966

3,244,244
AIR CUSHION VEHICLES HAVING FLEXIBLE SKIRTS DEFLECTABLE BY SUBSIDIARY CUSHION PRESSURE
Christopher Sydney Cockerell, Southampton, England, assignor to Hovercraft Development Limited, London, England, a British company
Filed Nov. 12, 1963, Ser. No. 322,753
Claims priority, application Great Britain, Nov. 13, 1962, 42,992/62
14 Claims. (Cl. 180—7)

This invention relates to vehicles for travelling over a surface and which are supported above that surface, at least in part, by a cushion of pressurised gas formed and contained beneath the vehicle.

It has been proposed to contain the cushion of pressurised gas, partly or wholly, by curtains of moving fluid issuing from the lower part of the vehicle body. It has also been proposed to contain the upper part of a cushion by downwardly depending flexible members, means being provided for causing fluid to issue from the bottom of each member to form fluid curtains which contain the lower part of the cushion.

When fluid curtains are used alone to close the gap between the lower part of the vehicle body and the surface, the contained cushion pressure acts over the entire height of the curtain, i.e. the distance between the lower part of the vehicle body and the surface. It is necessary for the energy content of curtain forming fluid to be sufficient to form a curtain having the necessary strength.

If a downwardly projecting flexible member is provided, the power requirement for a fluid curtain is reduced. The flexible member forms the upper part of the cushion containing means and the fluid curtain the lower part, the height of the fluid curtain being reduced for the same clearance, or distance, between the bottom of the vehicle body and the surface.

With a combination of flexible member and fluid curtain, as described above, the smaller irregularities of the surface over which the vehicle is travelling are accommodated by the fluid curtain, whilst irregularities of a height greater than the height of the fluid curtain are accommodated by deflection of the flexible member. The deflection of the flexible member is produced by physical contact between the member and the surface. Such contact results in abrasion of the member and if the vehicle is travelling at high speed severe damage can occur. Further, considerable drag is created by the contact between the member and the surface.

A difficulty thus arises in deciding on the relative vertical proportions of the flexible member and the fluid curtain. The more of the clearance between the bottom of the vehicle body and the surface which is closed by the flexible member the lower the power requirements for producing the fluid curtain; but this is accompanied by an increase in wear of, and the possibility of damage to, the flexible member. Conversely the less of the clearance closed by the flexible member the higher the power requirements with less wear and possibility of damage.

The present invention provides a containing means for a gaseous cushion which comprises a downwardly depending flexible member and in which a fluid is caused to flow down one surface of the member in contact therewith so that, when the clearance between the bottom of the member and the surface decreases sufficiently, an increased pressure is set up beneath a lower part of the member to at least assist in deflecting the member away from the surface.

According to the invention in one aspect, the arrangement is such that when the clearance decreases sufficiently at least part of the fluid flow breaks away from the surface so as to form a curtain to assist in containing a subsidiary cushion of pressurised fluid beneath the lower part of the flexible member, the subsidiary cushion at least assisting in deflecting the member away from the surface.

The break away of the fluid flow can be caused by a change of shape imposed on the surface of the flexible member or by a local increase of pressure in the region towards which the fluid is flowing.

The fluid flowing down the surface of the member can be caused to flow in contact therewith due to the Coanda effect, and the surface of the member can be profiled to enhance this effect.

Further it is possible to provide guide vanes or the like to assist in maintaining the fluid flow in contact with the surface of the member.

The flexible member can be made of material which is itself flexible, or of rigid sections flexibly connected and the use of the term flexible member hereinafter, when appropriate, is intended to include such constructions.

The invention will be readily understood by the following description of various examples in conjunction with the accompanying drawings, in which:

FIGURE 1 is a vertical cross-section of a known arrangement,

FIGURE 2 is a vertical cross-section of one embodiment of the invention,

Figure 5:
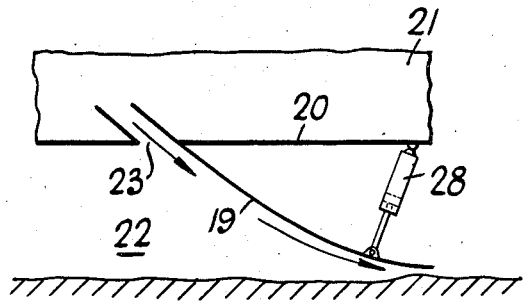
Figure 6:
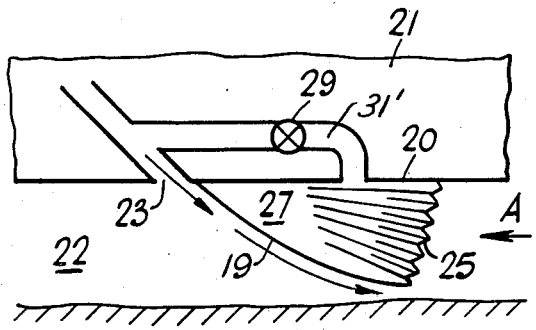
Figure 7:
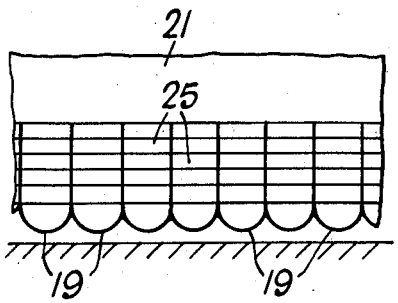
Figure 8:
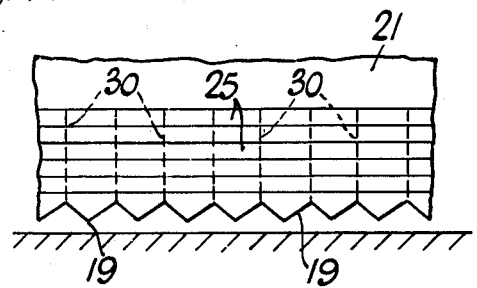
Figure 13:
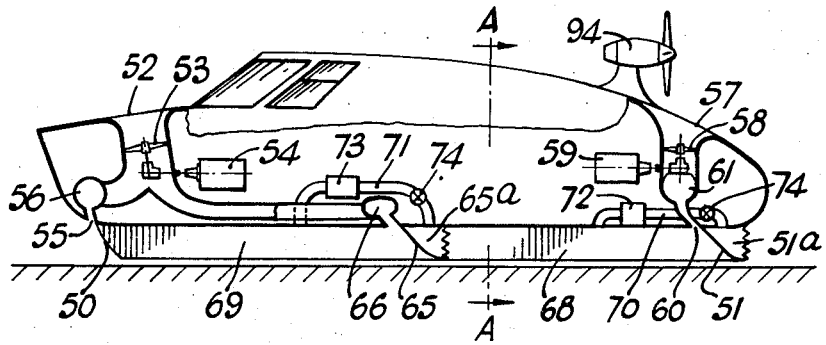
Figure 14:
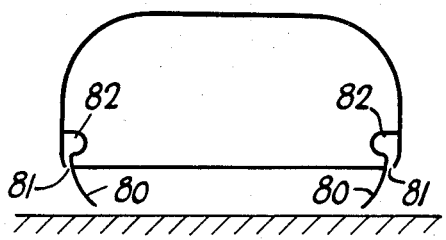
Figure 15:
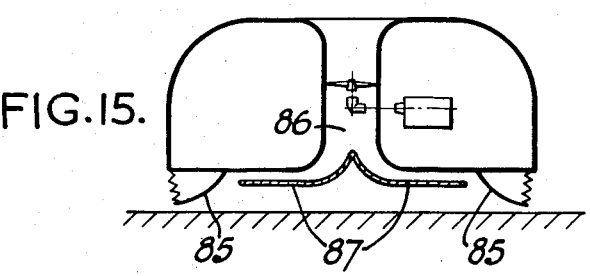
Figure 16:
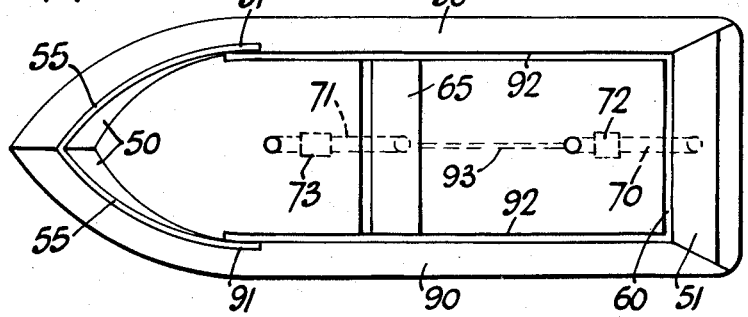

FIGURE 3 illustrates an alternative operating condition of the embodiment illustrated in FIGURE 2, FIGURE 4 is a vertical cross-section of a further embodiment, FIGURE 5 is a modification of FIGURE 4, FIGURE 6 is a further modification of FIGURE 4, FIGURE 7 is a side view of the embodiment shown in the direction of the arrow A, in FIGURE 6, illustrating one form of construction, FIGURE 8 is a similar view to that of FIGURE 7, illustrating an alternative form of construction, FIGURE 9 is a cross-section similar to that of FIGURE 2 illustrating a modification thereof, FIGURE 10 illustrates an alternative operating condition of the arrangement illustrated in FIGURE 9, FIGURE 11 illustrates a further alternative operating condition of the arrangement illustrated in FIGURE 9, FIGURE 12 illustrates a further modification of the embodiment illustrated in FIGURE 2, FIGURE 13 is a vertical cross-section of a vehicle, parallel to the fore and aft axis, illustrating the application of the embodiments illustrated in FIGURES 2 and 3, and FIGURE 4, FIGURE 14 is a cross-section on the line A—A of FIGURE 13 illustrating one particular form of side walls, FIGURE 15 is a cross-section similar to that of FIGURE 14, illustrating a modification thereof, and FIGURE 16 is an inverted plan view of the vehicle illustrated in FIGURE 13.

FIGURE 1 illustrates a known arrangement in which a hollow flexible member 1 depends from the bottom surface 2 of the vehicle body 3. Air is supplied from a convenient source, not shown, to a duct 4. Air flows from the duct 4 through the hollow member 1 and issues from the bottom to form an air curtain 5. A cushion of pressurised air is formed and contained in the space 6.

When operating normally, as in FIGURE 1, the total clearance between the bottom surface 2 of the vehicle and the surface 7 over which the vehicle is travelling is sealed by the combination of the flexible member 1 and the air curtain 5. Any irregularities in the surface 7 which have a height less than the clearance between the bottom of the flexible member and the surface 7 pass beneath the flexible member without deflecting it.

If the irregularities of the surface 7 exceed the clearance between the bottom of the flexible member 1 and the surface 7, as is likely to happen with waves when the vehicle is operating over water, then the surface 7 will be in contact with the bottom of the flexible member and will also deflect the member. The pressure of the cushion acting on the inside of the member acts to prevent deflection of the member, and considerable forces can be applied to the member by contact with the surface. These forces are likely to be transmitted to the vehicle. Further, it is difficult to provide a flexible member 1 which is both stiff enough to withstand the pressure of the gaseous cushion formed at 6 and also readily deflected.

As a result severe abrasion occurs on the bottom part of the flexible member, tearing or similar damage is likely to occur and undesirable impact loads are also likely to be imparted to the main body of the vehicle.

FIGURE 2 illustrates one embodiment of the invention which comprises a flexible member 10 depending from the bottom surface 11 of the vehicle body 12. The flexible member 10, in the present example, is in the form of a sheet of flexible material which curves inwards towards the space 13 in which is formed the air cushion, having an inner concave surface and an outer convex surface. The convex surface faces outwards away from the space 13, but the lower part faces in a direction which is also towards the surface 16.

Air from a suitable source, not shown, is supplied to a supply port 14 formed in the bottom surface 11, the supply port being immediately adjacent to the convex surface of the flexible member 10. The air flows down in contact with the convex surface of the flexible member 10 and issues from the bottom thereof to form an air curtain 15. The air flow adheres to the convex surface as a result of the well known Coanda effect until it reaches the lower edge of the flexible member 10 which forms a discontinuity in the profile thereof beyond which the Coanda effect ceases and the air flow leaves the convex surface in a direction substantially tangential thereto when the vehicle is operating with a normal clearance as illustrated in FIG. 2.

Where the flexible member 10 extends continuously round a cushion or extends between structural members such as side-walls and is anchored at its ends to the structural members, the flexible member can be caused to assume the correct vertical profile by suitably shaping the material from which it is made. However, it is generally desirable that some means is provided for locating the bottom edge of the member, such as ties 9.

The operation of the embodiment illustrated in FIGURE 2 can be seen in FIGURE 3. When the surface 16 approaches more closely to the bottom of the flexible member 10, the air flowing down the convex surface of the member breaks away before reaching the bottom of the member forming a cushion of pressurised air at 17. Due to the Coanda effect which causes the air to attempt to adhere to the convex surface the pressure at 17 is higher than the pressure of the cushion in space 13. This cushion of pressurised air formed at 17, acts on the bottom of the flexible member 10 in opposition to the cushion pressure acting on the concave surface of the member and deflects the flexible member. The convex surface thus faces more and more towards the surface 16 increasing the effect of the cushion of pressurised air at 17. Furthermore, when the surface 16 then recedes from the bottom of the flexible member 10, the pressure at 17 decreases, and may even disappear, allowing the pressure of the main supporting cushion to act as a restoring force to ensure that the flexible member 10 returns to its correct position rapidly. As shown in FIG. 3, the flexible member 10 may be provided with small horizontally extending protrusions or ridges 48 on the lower part of the convex surface thereof, which protrusions form defined positions at which the flow of air will break away from the convex surface on deflection of the member 10.

If desired, a further flow of fluid can be caused to flow down the concave, or inner, surface of the flexible member 10 from a port 18.

The embodiment illustrated in FIGURES 2 and 3 is particularly suitable for cushion containing means across the front of a vehicle, and is also suitable for containing means extending along the sides of a vehicle or parallel to the sides of a vehicle. A further use is for cushion containing means which extend across the vehicle at an intermediate position, between the ends of the vehicle. The deflection of the member is likely to be impeded unless the member is positioned so that its bottom edge is directed rearwards. This is because obstacles and irregularities in the surface 16 will oppose the direction of movement in the flexible member when it deflects.

A similar difficulty will arise if an arrangement as illustrated in FIGURES 2 and 3 is used extending across the rear of the vehicle, as the bottom of the flexible member 10 will move forward as it deflects and this forward movement will be opposed by the relative rearward movement of obstacles or surface irregularities passing beneath the flexible member.

FIGURE 4 illustrates an embodiment which is suitable for use at the rear of a vehicle and at other positions having similar requirements.

In the embodiment illustrated in FIGURE 4 a flexible member 19 depends from the bottom surface 20 of the vehicle body 21 but is inclined rearwards away from the cushion formed at 22. A supply port 23 is formed inboard of and immediately adjacent to the member 19 and air from a suitable source, not shown, is fed to the supply port and flows down in contact with the convex surface of the member 19 again adhering to the convex surface as a result of the Coanda effect. In this particular example, the whole of the convex surface has at least a component of direction towards the surface. Normally the air escapes beneath the bottom edge of the member 19, but when the clearance between the bottom edge of the member and the surface decreases, part of the air deflects inwards, as at 24 and a cushion of air is formed at 24a. This cushion has a pressure higher than that of the supporting cushion at 22 and tends to maintain the bottom of the member 19 clear of the surface.

The pressure of the supporting cushion 22 acts on the member 19 and tends to lift it away from the surface and it is necessary to provide some loading to offset this. In the example illustrated in FIGURE 4, a further flexible member 25 in the form of a bellows, is provided between the bottom of the member 19 and the vehicle structure. The folds of the bellows are constrained by cords or the like 26. A closed space 27 is thus formed and air can be fed to this space. For example, the space 27 can be in communication with the cushion space 22 via a duct indicated diagrammatically at 31.

FIGURE 5 illustrates a modification of FIGURE 4 in which, instead of a closed space being formed, hydraulic jacks 28, or similar means, are provided for positioning the member 19. In such an arrangement, at least the lower part of the member 19 is preferably of fairly stiff construction. The upper part of the member 19 can be quite flexible as it will take up a curved form under the forces acting upon it. Provision can be made for varying the load applied to the member 19 by either the pressure at 27 in FIGURE 4 or by the jacks 28 in FIGURE 5. For example, as illustrated in FIGURE 6, which is a further modification of FIGURE 4, the space 27 can be in communication with the air supply to the port 23 via a duct 31' and the pressure in the space 27 can be controlled by a valve 29. A constant leak from the space 27 is required to ensure that the pressure in space 27 decreases when the valve 29 is operated to reduce the pressure of the supply. To provide flexibility in the peripheral length of a member, it can be made in separate sections which can move relative to one another, or it can be convoluted, the convolutions running vertically. Thus, the example illustrated in FIGURE 6 can be of separate sections side by side, as in FIGURE 7, or a single section with the member 19 convoluted, as in FIGURE 9, the convolutions being formed by ties 30, thus provided excess material which will allow vertical movement of one part of a member relative to another.

The flow of air down the convex surface of the member 10 in FIGURES 2 and 3 may tend to break away at height above that desired. The flow can be caused to adhere to the convex surface more effectively by providing guide vanes adjacent to the surface. This is illustrated in FIGURE 9 where a plurality of horizontally extending, vertically spaced guide vanes 35, 36 and 37 are provided adjacent to the convex surface of the member 10. The guide vanes are positioned relative to the convex surface of the member so that the highest vane 35 is at the greatest distance from the convex surface, this distance being a little less than the width of the supply port 14. The remaining guide vanes are positioned successively closer to the convex surface of the member 10 the lowest being closest to the convex surface. The number of guide vanes may vary and also their vertical positioning. The guide vanes are mounted on the flexible member 10 by struts or the like and move with the member 10 when it is deflected.

The effect of the guide vanes can be appreciated from FIGURES 10 and 11. When the surface 16 approaches the bottom edge of the flexible member 10, i.e. the clearance between the bottom surface 11 of the vehicle and the surface 16 decreases, the guide vanes maintain the flow of air in contact with the convex surface to a much lower position than in the arrangement illustrated in FIGURE 3 without guide vanes. As a result the radius of curvature of the curtain formed by the air is much smaller, as will be seen at 38, and the pressure of the air cushion formed at 17 is higher than that in FIGURE 3, with a greater deflecting effect in the flexible member 10.

With a continued decrease in the clearance between the bottom surface 11 of the vehicle and the surface 16, as shown in FIGURE 11, the bottom edge of the lowest guide vane 37 can almost contact the surface 16 and the pressure at 17 will be substantially equal to the pressure of the air supply for forming the air curtains. Also the higher guide vanes will maintain the flow of air in contact with the convex surface down to a position quite close to the surface 16. This air will then deflect with a small radius of curvature with the formation of a cushion of air at 39 having a higher cushion pressure as described above with respect to FIGURE 10. A further cushion of pressurised air may be formed at 40 and 41. The pressure of the cushions formed beneath the lower part of the flexible member 10 during the operating conditions illustrated in FIGURES 10 and 11 will usually be above the pressure of the cushion at 13 and an inflow of air will occur beneath the bottom edge of the member 10 so long as this is clear of the surface 16.

The deflection characteristics of the flexible members, as described above, can be varied by varying the stiffness of the members, for example by making them with a tapered thickness, being thicker at the top and thinner at the bottom.

An alternative, or additional way of maintaining the flow of curtain-forming air in contact with the convex surface of the flexible member 10 is to provide perforations in this surface and maintain a suction at these perforations thus enhancing the Coanda effect. FIGURE 12 illustrates one arrangement in which the flexible member 10' is hollow and air is sucked from inside the member via duct 45. As the air issuing from the supply port 14 flows down the convex surface of the flexible member 10' some of the air is drawn through perforations 46 into the interior of the member. The member must, of course, be of such construction as will permit the creation of a reduced pressure in its interior and at the same time be capable of deflection.

FIGURE 13 is a vertical cross-section of a vehicle parallel to the fore and aft axis, illustrating the application of the invention. A flexible member 50 is provided across the front of the vehicle, the flexible member being of the form described above and illustrated in FIGURES 2 and 3. At the rear of the vehicle there is a flexible member 51 of the form described above and illustrated in FIGURE 4. Air for the air curtain at the front of the vehicle is drawn in through an intake 52 by one or more propellers 53 driven by one or more engines 54. The air is fed from the propellers 53 to the supply port 55 via a duct 56. At the rear, air is drawn in through an intake 57 by one or more propellers 58 driven by one or more engines 59 and fed to a supply port 60 via a duct 61. The cushion is contained along the sides of the vehicle by downwardly depending side wall members, the form of which can vary, two examples being illustrated in FIGURES 14 and 15.

Also illustrated in FIGURE 13 is the provision of a further flexible member 65 for subdividing the cushion. This member is also of the form as described above and illustrated in FIGURE 4. The air for the air curtain can be provided via duct 66 from the air supply for the front curtain. Other forms of construction can be used for the flexible member 65, and flexible members can also be provided extending parallel to the fore and aft axis of the vehicle.

In the vehicle illustrated in FIGURE 13, the spaces 51a and 65a inside the members 51 and 65, are in communication with the cushions formed in spaces 68 and 69 via ducts 70 and 71. Energising means 72 and 73 are provided at some convenient position in each duct to increase the pressure in the spaces 51a and 65a above the cushion pressures, if desired. The energising means can also be provided with means for controlling the pressure in the spaces 51a and 65a, such as control valves 74.

As stated above, the cushion or cushions can be contained along the sides of the vehicle by side wall members. These members can be rigid or flexible, with or without curtains of air formed from their lower edges. Conveniently, forms of member according to the present invention can be used.

FIGURE 14 illustrates side wall members 80 of the form illustrated in FIGURES 2 and 3. Air is supplied to support ports 81 via ducts 82 which can be fed from either or both of the ducts 56 and 61 which supply the front and rear curtains.

FIGURE 15 illustrates the application of side wall members 85 of the form illustrated in FIGURE 4. In this example, the air is fed to the inner surfaces of the members 85 from a control duct 86. The air is deflected outwards from the duct 86 by a deflector 87. The air, after deflection by the deflector 87, flows outwards towards the members 85 and then down the innner surface thereof.

The use of flexible members as illustrated in FIGURE 14 decreases the effective cushion area, whilst flexible members as illustrated in FIGURE 15 enable a cushion to be formed which has an effective area equal to the area of the bottom of the vehicle. By using structures for the flexible members which allow the members to project beyond the periphery of the bottom surface of the vehicle, an effective cushion area greater than the area of the bottom of the vehicle can be provided.

Thus it will be seen that the supporting cushion or cushions can be contained for the entire periphery of the bottom of the vehicle by flexible members according to the invention, and also subdivided by such members. Conveniently, where one form of member is used for one part of the periphery and another form for an adjacent part of the periphery, the transition from one form to the other is gradual. As illustrated in FIGURE 16, for example, which is an inverted plan view of a vehicle as in FIGURE 13, the front of the vehicle has a flexible member 50 of the form illustrated in FIGURES 2 and 3, a flexible member 51 of the form illustrated in FIGURE 4 at the rear, and flexible members 90, again of the form illustrated in FIGURE 4, along the sides.

The transition between the front member 50 and the side members 90 is gradual, the member 50 becoming more and more vertical as it approaches the transitional points 91. At this point the side members 90 are also vertical, gradually becoming more and more inclined to the vertical as the distance from the transitional points 91 increases. The supply port 55 external of the front member continues to a position adjacent to the transitional points 91, whilst supply ports 92 inside the side members start at a similar position. The cushions can be further divided by flexible members as at 93, or by curtains of air, or by a combination of both.

The ability to control the deflection of the member, for example by vanes or jacks, as in FIGURE 5, or by varying the inflation pressure when of the form illustrated in FIGURE 6, provides an opportunity for creating stabilising forces acting on the vehicle. For example, with the cushion subdivided as in FIGURES 13 and 16, should the vehicle tend to tilt down at the rear, if the member 51 is held down, by increasing the pressure in 51a, then the pressure in space 68 will increase, providing a force opposing the movement of the vehicle. Stabilising forces about various axes can be created.

Vanes can be positioned in the ports from which issues the fluid to provide propulsion or manoeuvering thrusts. The vanes can be fixed or movable depending upon the use for which they are required, although generally propulsion will be by separate propulsion units, or example engines and propellers 94.

I claim:
1. A vehicle for travelling over a surface and which, in operation, is supported above that surface by at least one cushion of pressurised gas formed and contained in a space beneath the vehicle body, comprising a wall structure capable of vertical deflection for containing said cushion for at least part of its periphery, said structure including a flexible member depending from and having its upper edge connected to the lower part of the vehicle body and its lower edge free to move vertically relative to said body, said member having a profile in a vertical plane normal to the cushion periphery which extends in a curve downwardly beneath the vehicle and provides a convex surface on said member at least the lower part of which faces toward the subjacent surface over which the vehicle is operating, and means for so discharging fluid from the lower part of the vehicle body adjacent the upper edge of said member that said fluid flows down in contact with said convex surface to the lower edge of said member in a substantially coherent stream by the Coanda effect, the lower edge of said member forming a discontinuity in the profile thereof beyond which the Coanda effect ceases and the fluid leaves the convex surface in a direction substantially tangential thereto when the vehicle is operating with a normal clearance between the lower part of said convex surface and the subjacent surface, whereby when said clearance decreases a region of increased fluid pressure is formed between the lower part of said convex surface and said subjacent surface which is effective to cause a portion of said fluid flow to become detached from said convex surface above the lower edge of said member and to form a fluid curtain which flows downwardly toward said subjacent surface, said curtain combining with said member and said subjacent surface to enclose a subsidiary cushion space wherein sufficient pressure is built up to raise the lower part of said member and maintain it out of contact with said subjacent surface.

2. A vehicle as claimed in claim 1 including at least one irregularity extending horizontally on the lower part of the member.

3. A vehicle as claimed in claim 1 comprising a series of ridges formed on the lower part of the convex surface.

4. A vehicle as claimed in claim 1 wherein the lower part of said member extends outwardly away from the cushion space.

5. A vehicle as claimed in claim 1 including means extending between the lower part of the member and the lower part of the vehicle for limiting the downward movement of the lower edge of the member.

6. A vehicle as claimed in claim 5 wherein the means extending between the lower part of the member and the lower part of the vehicle comprises at least one hydraulic or pneumatic ram.

7. A vehicle as claimed in claim 1 including means for enhancing the Coanda effect which maintains the fluid flow in contact with the convex surface.

8. A vehicle as claimed in claim 7 wherein the said convex surface is perforated, and including means for applying a suction to the perforations whereby the Coanda effect is enhanced.

9. A vehicle as claimed in claim 7 wherein the means for enhancing the Coanda effect comprises at least one guide vane extending horizontally and spaced a short distance from the convex surface of the member, the guide vane being substantially parallel to said convex surface.

10. A vehicle as claimed in claim 9 including a series of said guide vanes extending one below the other, each succeeding lower vane being positioned closer to the convex surface.

11. A boundary wall structure for the enclosure of the cushion space of a gas cushion vehicle comprising a flexible wall member having a cross-sectional configuration in the form of a curve extending downwardly beneath the vehicle and having a convex surface at least the lower part of which faces toward the subjacent surface over which the vehicle is supported, said member depending from and having its upper boundary connected to the lower part of the vehicle body and its lower boundary free to move vertically relative to said body, the lower part of the convex surface of the wall member and the subjacent surface forming a convergent space, means for delivering a fluid to the upper boundary of the wall member for laminal flow down the convex surface thereof, the curvature of said member and its flexibility being such that under normal operating conditions of said air cushion vehicle with a normal clearance between the lower part of said convex surface and the subjacent surface the laminal flow adheres to the convex surface of the wall member by the Coanda effect and flows towards said convergent space and, with increasing pressure in the convergent space due to decreasing clearance, is detached from the convex surface at progressively higher points so as to form a curtain of moving fluid between said convex surface and said subjacent surface, whereby the pressure in said convergent space may be built up sufficiently to raise the lower boundary of said member and maintain it out of contact with said surface.

12. A vehicle for travelling over a surface and which, in operation, is supported above that surface by at least one cushion of pressurised gas formed and contained in a space beneath the vehicle body, comprising a flexible wall structure depending from the vehicle body for containing said cushion for at least part of its periphery, said structure including inner and outer wall means spaced from each other to define a passageway therebetween, and means for supplying fluid to the upper end of said passageway so that said fluid issues from the lower end of said wall structure in the form of a fluid curtain, said outer wall means defining a plurality of openings through which fluid may escape from said passageway, said openings being so positioned that when the clearance between the lower end of said wall structure and the surface beneath the vehicle body decreases said escaping fluid forms a cushion of pressurized fluid which is contained between said wall structure and said surface and which tends to maintain said wall structure out of contact with said surface.

13. A vehicle for traveling over a surface and which, in operation, is supported above that surface by at least one cushion of pressurised gas formed and contained in a space beneath the vehicle body, comprising a wall structure capable of vertical deflection for containing said cushion for at least part of its periphery, said structure including a flexible skirt member formed of a single sheet of flexible material depending from and having its upper edge connected to the lower part of the vehicle body and its lower edge free to move vertically relative to said body, said skirt member having a profile in a vertical plane normal to the cushion periphery which extends in a curve downwardly beneath the vehicle and provides a convex surface on said member at least the lower part of which faces toward the subjacent surface over which the vehicle is operating, a tie member connecting the lower edge of said skirt member and the lower part of the vehicle body for limiting the downward movement of said lower edge, and means for so discharging fluid from the lower part of the vehicle body adjacent the upper edge of said skirt member that said fluid flows down in contact with said convex surface to the lower edge of said member in a substantially coherent stream by the Coanda effect, the lower edge of said member forming a discontinuity in the profile of said member beyond which the Coanda effect ceases and the fluid normally leaves the convex surface in a direction substantially tangential thereto.

14. A vehicle for travelling over a surface and which, in operation, is supported above that surface by at least one cushion of pressurised gas formed and contained in a space beneath the vehicle body, comprising a wall structure capable of vertical deflection for containing said cushion for at least part of its periphery, said structure including a flexible skirt member formed of a single sheet of flexible material depending from and having its upper edge connected to the lower part of the vehicle body and its lower edge free to move vertically relative to said body, said skirt member having a profile in a vertical plane normal to the cushion periphery which extends in a curve downwardly beneath the vehicle and provides a convex surface on said member at least the lower part of which faces toward the subjacent surface over which the vehicle is operating, a tie member connecting the lower edge of said skirt member and the lower part of the vehicle body for limiting the downward movement of said lower edge, a plurality of horizontally extending guide vanes spaced a short distance from the convex surface of said skirt member and positioned one below the other, said guide vanes forming with said convex surface a fluid passageway, and means for discharging fluid from the lower part of the vehicle body into the upper end of said passageway so that said fluid flows down in contact with said convex surface to the lower edge of said member in a substantially coherent stream by the Coanda effect and normally issues from the lower end of said passageway in the form of a fluid curtain which flows downwardly toward said subjacent surface.

References Cited by the Examiner

FOREIGN PATENTS 1,272,678    8/1961    France.
1,319,034    1/1963    France.

BENJAMIN HERSH, *Primary Examiner.*

M. S. SALES, *Assistant Examiner.*